United States Patent Office 3,380,876
Patented Apr. 30, 1968

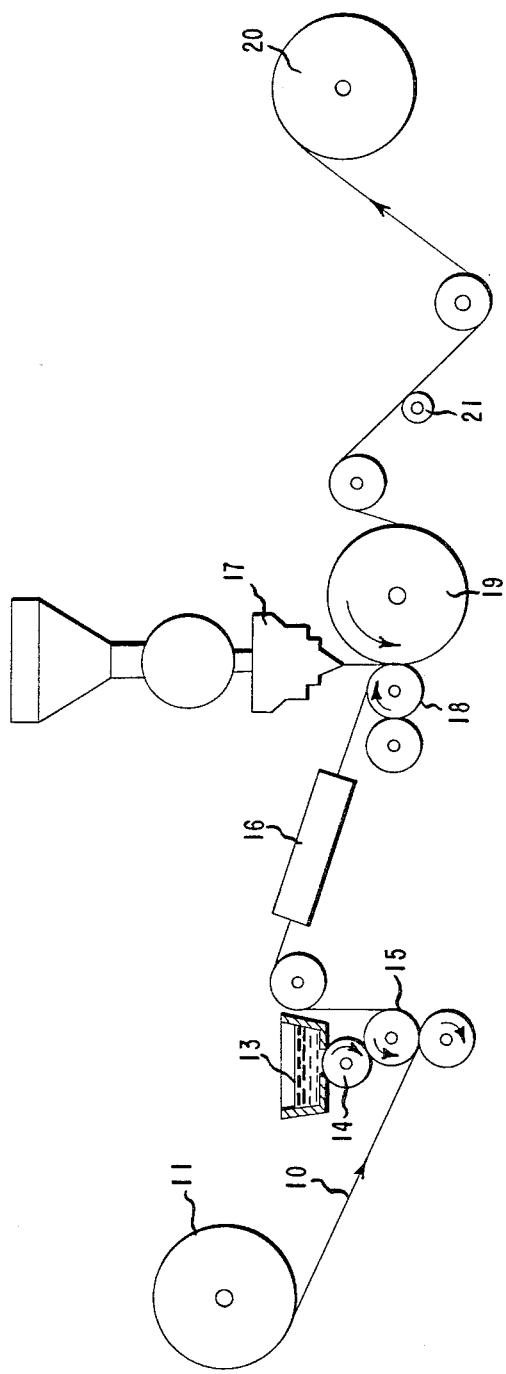

3,380,876
BONDING THERMOPLASTIC MATERIALS TO
SUBSTRATES WITH COLLOIDAL SILICA
Robert L. Rusher, Wilmington, Del., assignor to E. I. du Pont de Nemours and Company, Wilmington, Del., a corporation of Delaware
Continuation-in-part of application Ser. No. 248,719, Dec. 31, 1962. This application June 20, 1967, Ser. No. 647,369
5 Claims. (Cl. 161—162)

ABSTRACT OF THE DISCLOSURE

A film of thermoplastic material is bonded to a substrate by the use of a coating of colloidal silica containing a minor amount of certain organic additives. These additives include polyethylene glycol tert-dodecylthioether, polyoxyethylene sorbitan monolaurate, and water soluble resin of ethylene oxide polymers with molecular weights in the range 100,000 to several million.

CROSS-REFERENCE TO RELATED APPLICATION

This application is a continuation-in-part application to my copending application Ser. No. 248,719, filed Dec. 31, 1962, and now abandoned.

BRIEF SUMMARY OF THE INVENTION

This invention relates to coated substrates which carry a film of a thermoplastic material and more particularly to coated substrates and to processes for their preparation in which a thermoplastic material such as polyethylene is bonded through a coating of colloidal silica particles with an organic additive to the substrate.

In the prior art it has been possible to make coated structures of diverse materials such as paper and polyethylene, but this has been accomplished rather slowly with thick films of the thermoplastic material and at relatively high temperatures. According to the present invention, the coating can be made at higher speeds with thinner films of thermoplastic material and at lower melt temperatures. The use of a lower temperature reduces oxidation so that an odor problem is avoided and heat sealability of the thermoplastic material is not impaired.

The prior art also teaches the use of colloidal silica as a bonding agent. U.S. Patent 3,142,609 to Deretchin and Santee describes a method of improving the adhesion of polyethylene to paper by the use of colloidal silica as a bonding agent.

I have discovered that adhesion of thermoplastic materials, e.g., polyethylene, to various substrates, including paper, can be surprisingly improved by the use of specific organic additives with the colloidal silica. These additives consist of polyethylene glycol tert-dodecylthioether, polyoxyethylene sorbitan monolaurate, and water soluble resins of ethylene oxide polymers with molecular weights in the range 100,000 to several million.

BRIEF DESCRIPTION OF THE DRAWING

The figure illustrates a process of the invention for applying an extruded thermoplastic material to a coated substrate.

DETAILED DESCRIPTION OF THE INVENTION

The invention is applicable to a wide range of substrates and, in general, any solid material can be used. It is preferred that the substrate be a sheet material and a most preferred substrate is a felted cellulosic material such as the various forms of paper, cardboard, boxboard, milk carton stock and tissue paper. The invention is also applicable to formed articles of felted cellulose such as paper dishes, knives, forks, spoons, cups and various fabricated articles such as paper curtains, paper clothing and containers such as milk or other liquid containers, butter cartons, beer containers and oil containers. Other articles include food packages, decorative coverings and construction board.

Specific substrates suitable for use in the present invention include glass and other vitreous substrates; impregnated substrates such as asphalt impregnated cellulosics; hardboards such as "Masonite"; cement-asbestos boards; wood substrates such as birch, oak, pine, etc.; thermoplastic and non-thermoplastic polymeric substrates, preferably in film form, such as homopolymers and copolymers of vinyl chloride, vinylidene chloride, polyolefins such as polyethylene and polypropylene, vinyl acetate, acrylic esters, regenerated cellulose, polyesters such as polyethylene terephthalate, ureamelamine- or phenol-formaldehyde resins; composite substrates such as plywood or fabrics which are coated, impregnated or both; and metal substrates such as iron, steel, galvanized iron and steel, bronze, brass, lead, tin, nickel and aluminum and various other alloys.

Exemplary of a useful substrate is aluminum which can be in the form of sheet or foil. From such coated aluminum sheets there can be made cans for foods and packages of all types. The foils can be used for wrapping purposes and also for making decorative sheets. Also, the coated aluminum alone or together with paper can be used in multiwall bags.

The layer between the substrate and thermoplastic coating which anchors the coating to the substrate is composed of colloidal silica particles and a minor amount of an organic additive. The colloidal silica particles are essentially discreet particles having at least one dimension of the ultimate particle being less than 100 millimicrons. If the colloidal silica particles are aggregated, the aggregate will have at least one dimension no greater than 100 millimicrons on the average.

A preferred source of the colloidal silica particles is a silica sol. These sols can be prepared as shown in the Bechtold and Snyder U.S. Patent No. 2,574,902. Ordinarily these sols contain about 30% of $SiO_2$ as they are sold in commerce and they can be diluted to whatever extent desired for use in the present invention. The particle size of such sols will ordinarily be around 15 millimicrons in diameter although sols can be made according to the processes of that patent with particles ranging in the diameter up to the limits of colloidal dimensions, i.e., from 1 to 500 millimicrons.

Various other silica sols with uniform discreet particles can be prepared with particle sizes ranging from about 5 millimicrons as in the Bird Patent 2,244,325 up to 30 millimicrons as shown in the Reuter Patent 2,856,302. There is also the Reuter Patent 3,029,151 which shows a process for preparing silica sols having particles ranging between 6 and 10 millimicrons.

Still other silica sols which can be employed in the present invention are those shown in White 2,285,477; Marshall 2,356,774; White 2,375,738; Trail 2,572,578; Trail 2,573,743; Legal, Jr., 2,724,701.

Sols which are composed of silica particles which are somewhat aggregated can also be used, though the aggregate should not exceed about 100 millimicrons in size. These can be made by the flame hydrolysis or oxidation of silicon tetrachloride as disclosed in Reik Patent 2,428,178 and in Broughton Patent 2,535,036. Aggregated products can also be prepared according to the Marshall and White Patents previously mentioned as well as according to some of the other patents already named, depending upon the condition selected.

If desired, an alumina modified silica sol as disclosed in Alexander and Iler Patent 2,892,797 can be used. This silica sol is a dispersion of colloidal silica, the particles of which are partially coated with aluminate groups. The silica particles are discreet, spheroidal, and about 15 millimicrons in diameter on the average. The silica concentration is about 30%. The ratio of aluminate ions to surface silicon atoms is about 0.05, and the weight ratio of total silica to added aluminate as $Al_2O_3$ is about 140. The pH of the sol is about 8.8 to 9.0 and the $$SiO_2:Na_2O$$

weight ratio is about 145–150.

It is to be observed that in the applied layer, the colloidal silica particles may aggregate so that the ultimate particles mentioned can form aggregates much larger than 100 millimicrons in their smallest dimension. It is the particle size of ultimate particles or ultimate aggregates before application which is important according to the purposes of the present invention.

The amount of colloidal silica applied should be such that enough is present to give an appreciable effect but there should not be a large enough quantity so as to give a continuous film upon the substrate. It is most preferred that the colloidal silica be present in an amount of 0.01 to 0.08 pound of the silica per 1,000 sq. ft. of substrate's surface. More broadly, the silica can be present from about 0.001 to 0.5 pound per 1,000 sq. ft. of substrate's surface.

The colloidal silica layer on the substrate contains an organic additive. This agent improves the effectiveness of the colloidal silica in promoting adhesion between the substrate and the thermoplastic film. The mechanism by which these agents act is not definitely known; it is believed that they in some manner modify the surface of the silica particles thereby improving their effectiveness as adhesion promoters.

The useful additives are commercially available compounds. These compounds are:

Polyethylene glycol tert-dodecylthioether, a nonionic surface active agent sold by the Pennsalt Chemical Corporation under the name "Nonic" 218;

Polyoxyethylene sorbitan monolaurate, a nonionic surface active agent sold by Atlas Chemical Industries under the name "Tween" 20; and Water soluble resins of ethylene oxide polymer with molecular weights in the range of 100,000 to several million. These resins are sold by Union Carbide Chemicals as "Polyox" WSR–35 (5% solution-viscosity 700 cps.) and "Polyox" WSR–301 (1% solution-viscosity 2500 cps.).

These agents are added to the colloidal silica and the mixture applied to the substrate.

The agents are applied at a concentration ranging from 2 to 9%, preferably 3 to 7%, based on the weight of the silica particles.

The coating carried on the solid substrate can be any extrudable thermoplastic material. The most preferred thermoplastic materials are the polyolefins, such as polyethylene and polypropylene. Other thermoplastic materials suitable for the coating in the present invention are homopolymers and copolymers of polyester, such as polyethylene terephthalate, vinyl chloride, vinylidene chloride, polyhexamethyleneadipamide, polycaproamide, polystyrene, and polymerized formaldehyde.

By priming a substrate with the colloidal silica-organic additive mixture according to the present invention, very thin films can be extruded onto the substrate at a much lower melt temperature and faster machine speeds. Thicker polyethylene coatings, i.e., over 1 mil in thickness, need no priming because there is no adhesion problem. Accordingly, although the present invention can be practiced using thicker thermoplastic films, the real benefit of the present invention is realized using thermoplastic films having a thickness under 1 mil.

The thermoplastic coating is applied by melt extrusion. This is schematically shown in the figure together with the application of the colloidal silica-organic additive mixture. As can be seen from the figure, the substrate such as paper 10 is unwound from the unwind station 11 and passed under a roller 15 where the adhesion coating is applied to the substrate by the standard "kiss-coating" technique with standard gravure printing or transfer roll equipment. Here the substrate receives a primer from a primer bath 13 as a thin, uniform coating. The primer is applied, as shown in the figure by rollers 14 and 15. Of course, only one roller need be used if desired.

The primed substrate then passes through a dryer 16 which can be infrared lamps or heated air to evaporate the colloidal silica carrier. The primed substrate then passes under a flat die 17 from which the molten thermoplastic material web such as polyethylene exits. The film is drawn down to its final gauge in the air gap formed between the die lips and the point at which the molten film contacts the substrate. The substrate-thermoplastic material is set as the materials are pressed and cooled between the pressure roll 18 and the chill roll 19. The coated substrate is then rewound on roller 20 after trimming by the trim unit 21, The substrate is primed by applying the colloidal silica-organic additive mixture from a dispersion by any conventional means and drying prior to the application of the thermoplastic film. The priming operation may be accomplished by such well-known techniques as spray coating, padding or immersion coating, transfer or "kiss-roll" coating (such as the gravure printing process), and doctoring methods employing an air-knife, trailing blade or single blade coater. The mixture can be applied anytime prior to being coated with the thermoplastic film.

In all cases, the carrier for the colloidal silica must be removed prior to the melt extrusion of the thermoplastic coating, whether the carrier is water or some other solvent.

The invention can be more fully understood by referring to the following examples.

Example 1

Milk carton stock is coated with a colloidal silica sol and also with a colloidal silica sol containing 3% "Nonic" 218 (polyethylene glycol tert-dodecylthioether) based on the weight of the silica.

The colloidal silica has a $SiO_2:Na_2O$ weight ratio of 95:1, 30% colloidal silica as $SiO_2$, a pH of 10 at 25° C. and an average particle size of 15 millimicrons.

The sol is applied to the milk carton stock at a treatment level of 0.05 lb. $SiO_2$/1000 sq. ft. of paper surface and the polyethylene film applied has a thickness of 0.75 mil. The polyethylene film is applied by the method depicted in the figure, the melt extruded polyethylene being at 590° F.

Within 24 hours after coating, one-inch wide strips are cut from the center sections of the coated sheets and the polyethylene adhesion measured. The adhesion is expressed as the force in grams per inch applied at an angle of 90° required to separate the polyethylene film from the substrate.

An initial adhesion of 260 gr./in. is obtained with the silica-organic additive coating as compared to 142 gr./in. for the silica primed paper applied from a silica sol not containing "Nonic" 218.

Similar results are obtained when the thermoplastic film is polypropylene and the substrate is aluminum foil.

Example 2

The procedure of Example 1 is followed except that the organic additive used is "Tween 20" (polyoxyethylene sorbitan monolaurate). In this example the silica sol contains 7% of "Tween 20" based on the weight of silica.

An initial adhesion of 192 gr./in. is obtained with the colloidal silica-"Tween 20" mixture as compared with an adhesion of 142 gr./in. with the colloidal silica alone.

Example 3

The procedure of Example 1 is followed except that the organic additive used is "Polyox" WSR-35 (Union Carbide Chemicals Company, water soluble resin of ethylene oxide polymer). In this example, the silica sol contains 5% of "Polyox" WSR-35 based on the weight of silica.

At silica sol treatment levels of 0.05, 0.10 and 0.15 lb. $SiO_2$/1000 sq. ft. of milk carton stock surface, the adhesion of the 0.75 mil of melt extruded polyethylene is 126, 142 and 150 grams/inch respectively for the paper treated with colloidal silica alone and 164, 220 and 254 grams/inch respectively to the paper treated with the colloidal silica containing "Polyox" WSR-35.

I claim:

1. A composite structure comprising a solid substrate carrying on one surface a coating of colloidal silica particles which have an ultimate particle size with at least one dimension under 100 millimicrons and from 2 to 9% based on the weight of the silica of an organic additive selected from the group consisting of polyethylene glycol tert-dodecylthioether, polyoxyethylene sorbitan monolaurate, and water soluble resins of ethylene oxide polymers with molecular weights in the range 100,000 to several million, and carried on said coating a continuous film less than 1 mil thick of a thermoplastic material having a melting point greater than 100° C.

2. In a process for applying a continuous film less than 1 mil thick of a thermoplastic material having a melting point greater than 100° C. onto a solid substrate, the improvement comprising applying to a surface of said substrate a coating of colloidal silica particles which have an ultimate particle size with at least one dimension under 100 millimicrons and from 2 to 9% based on the weight of the silica of an organic additive selected from the group consisting of polyethylene glycol tert-dodecylthioether, polyoxyethylene sorbitan monolaurate, and water soluble resins of ethylene oxide polymers with molecular weights in the range 100,000 to several million, and subsequently applying said continuous film on said coating.

3. The process of claim 2 wherein the thermoplastic material is selected from the group of polyethylene and polypropylene.

4. The process of claim 2 wherein the colloidal silica particles are coated from a silica sol.

5. The composite structure of claim 1 wherein the thermoplastic material is selected from the group of polyethylene and polypropylene.

References Cited

UNITED STATES PATENTS

| | | | |
|---|---|---|---|
| 3,142,609 | 7/1964 | Deretchin et al. | 161—39 |
| 3,235,426 | 2/1966 | Bruner | 156—2 |

MORRIS SUSSMAN, *Primary Examiner.*